(12) United States Patent
Carroll et al.

(10) Patent No.: US 12,320,507 B1
(45) Date of Patent: Jun. 3, 2025

(54) REINFORCING DEVICE FOR STREETLIGHT

(71) Applicant: Florida Power & Light Company, Juno Beach, FL (US)

(72) Inventors: David R. Carroll, Jensen Beach, FL (US); Christian Horgan, Franklin Lakes, FL (US); Mazen A. Younis, Miami, FL (US); Moeed T. Haq, Pembroke Pines, FL (US); James A. Dijoseph, Boca Raton, FL (US); Ioannis Georgoulakis, Miami, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 0 days.

(21) Appl. No.: 18/893,542

(22) Filed: Sep. 23, 2024

(51) Int. Cl.
| | |
|---|---|
| *F21V 21/108* | (2006.01) |
| *E04H 12/24* | (2006.01) |
| *F16B 2/00* | (2006.01) |
| *F21S 8/08* | (2006.01) |
| *F21V 21/14* | (2006.01) |
| *F21W 131/103* | (2006.01) |

(52) U.S. Cl.
CPC .......... *F21V 21/108* (2013.01); *F21S 8/086* (2013.01); *F21V 21/14* (2013.01); *E04H 12/24* (2013.01); *F16B 2/00* (2013.01); *F21W 2131/103* (2013.01)

(58) Field of Classification Search
CPC ...... F21V 21/108; F21V 21/14; F21V 21/116; F21S 8/086; F21W 2131/103; F16M 13/02; E04H 12/24; F16B 2/00; F16B 2/12; F16B 2/14
USPC .......................................................... 362/431
See application file for complete search history.

(56) References Cited

U.S. PATENT DOCUMENTS

| | | | |
|---|---|---|---|
| 6,766,992 B1 * | 7/2004 | Parker ................. | F16M 13/022 248/219.3 |
| 9,777,910 B2 * | 10/2017 | Hunt, III ................. | F21V 29/15 |
| 2010/0288897 A1 * | 11/2010 | Chang ....................... | G09F 7/18 248/229.2 |
| 2011/0134653 A1 * | 6/2011 | Williams ................ | E04H 12/02 362/431 |
| 2014/0328070 A1 * | 11/2014 | Oquendo, Jr. ........ | F21V 21/116 362/427 |
| 2019/0226665 A1 | 7/2019 | Wang et al. | |
| 2022/0057044 A1 * | 2/2022 | Ribeiro ................... | F21S 8/086 |
| 2024/0369216 A1 * | 11/2024 | Hamdan ................. | F21S 8/086 |

* cited by examiner

*Primary Examiner* — Laura K Tso
(74) *Attorney, Agent, or Firm* — Tarolli, Sundheim, Covell & Tummino LLP

(57) ABSTRACT

A device for reinforcing a connection between a mounting bracket and a pole includes a first mounting arm having a first base with a first slot. A first projection extends from the first base for engaging a first side of the pole. A second mounting arm includes a second base with a second slot and a second projection extending from the second base for engaging a second side of the pole. A single fastener extends through the first and second slots in the first and second mounting arms, an opening in the mounting bracket, and into the pole for fixing the device to the pole.

20 Claims, 5 Drawing Sheets

US 12,320,507 B1

REINFORCING DEVICE FOR STREETLIGHT

TECHNICAL FIELD

The present invention relates generally to streetlights, and specifically to a device for reinforcing an existing connection between a streetlight mounting bracket and a utility pole.

BACKGROUND

A light or utility pole is often used to suspend an exterior streetlight high above outdoor areas. Often times, a number of streetlights are secured near a top end of the utility pole to provide area lighting for a parking lot, street or sidewalk. Each streetlight is mounted to the pole using a mounting bracket in a manner intended to resist vibration, movement, or twisting caused by the wind or other forces over the life of the streetlight.

A typical installation procedure includes attaching the streetlight to a mounting bracket secured near a top end of the pole. An installer may have to drill holes into the pole and the mounting bracket. Bolts can then be inserted through the holes and anchored in place by nuts or other similar type fasteners to mount the streetlight to the pole and attempt to prevent twisting and movement of the streetlight relative to the pole. In practice, however, many times only one fastener is used to secure the mounting bracket to the pole, thereby reducing the efficacy of the mounting bracket to resist adverse weather conditions.

SUMMARY

In one example, a device for reinforcing a connection between a mounting bracket and a pole includes a first mounting arm having a first base with a first slot. A first projection extends from the first base for engaging a first side of the pole. A second mounting arm includes a second base with a second slot and a second projection extending from the second base for engaging a second side of the pole. A single fastener extends through the first and second slots in the first and second mounting arms, an opening in the mounting bracket, and into the pole for fixing the device to the pole.

In another example, a device for reinforcing a connection between a mounting bracket and a pole includes a first mounting arm having a first wedge-shaped base with a first slot and a first projection extending from the first base for engaging a first side of the pole. A second mounting arm has a second wedge-shaped base with a second slot and a second projection extending from the second base for engaging a second side of the pole. An adapter extends over a first portion of the mounting bracket and a second portion of the second mounting arm for limiting relative movement between the mounting bracket, the adapter, and the second mounting arm. A single fastener extends through the first and second slots in the first and second mounting arms, an opening in the mounting bracket, and into the pole for fixing the device to the pole.

In yet another example, a method for installing a device that reinforces a connection between a mounting bracket and a pole includes positioning a first mounting arm having a first base with a first slot and a first projection extending from the first base along a first side of the pole. A second mounting arm having a second base with a second slot and a second projection extending from the second base is positioned along a second side of the pole such that the first and second bases are aligned and engage one another. A single fastener is passed through the first and second slots in the first and second mounting arms, an opening in the mounting bracket, and into the pole for fixing the device to the pole.

Other objects and advantages and a fuller understanding of the invention will be had from the following detailed description and the accompanying drawings.

DETAILED DESCRIPTION

Figure 1:
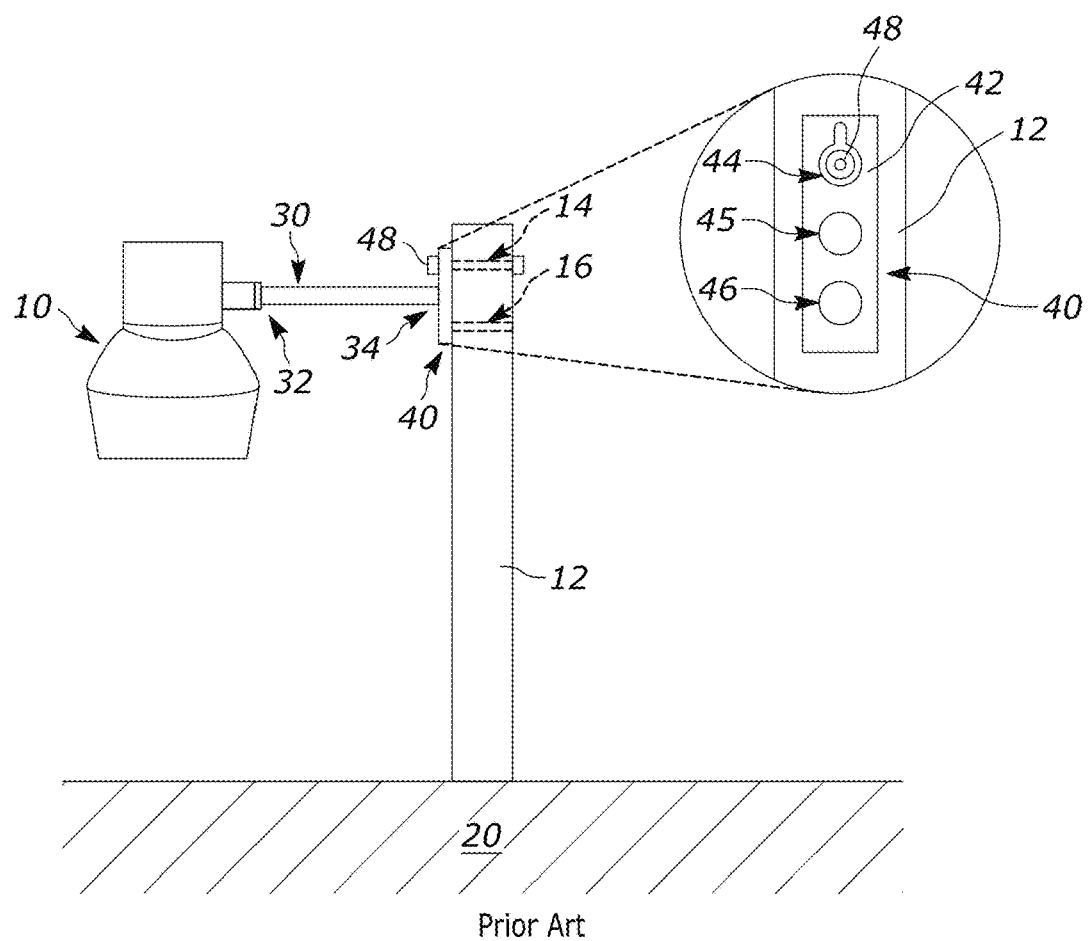
FIG. 1 is a schematic illustration of an existing connection between a streetlight, mounting bracket, and pole.

The present invention relates generally to streetlights, and specifically to a device for reinforcing an existing connection between a streetlight mounting bracket and a utility pole. FIG. 1 depicts the current connection between a streetlight 10 and a light or utility pole 12 extending from the ground 20. The pole 12 can be made of wood, concrete or metal and can have a round or rectangular cross-section along its length. In this example, the pole 12 is metal and has a rectangular cross-section with a width W and a depth D. The pole 12 can have a width W or diameter on the order of about 7" to about 14".

Figure 2:
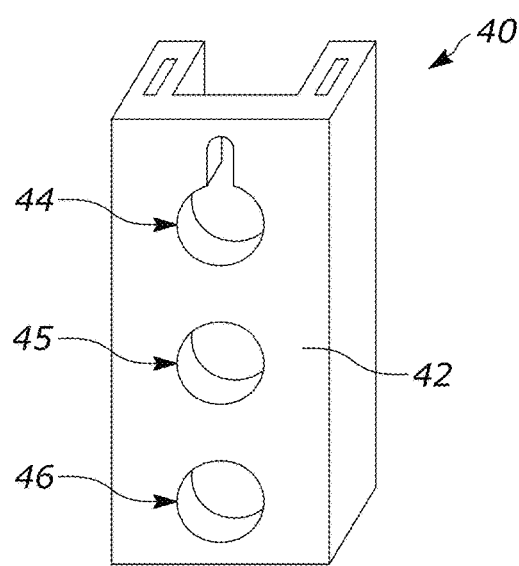
FIG. 2 is a schematic illustration of the mounting bracket of FIG. 1.

A support arm 30 has a first end 32 connected to the streetlight 10 and a second end 34 connected to a mounting bracket 40. As shown in FIG. 2, the mounting bracket 40 is generally C-shaped in cross-section and has an elongated base 42. The base 42 abuts the exterior of the pole 12 such that the lengths of the base and pole are parallel to one another. First, second, and third openings 44, 45, 46 extend through the base 42. As shown, the first opening 44 is a top opening, the second opening 45 is a middle opening, and the third opening 46 is a bottom opening.

The mounting bracket 40 can be formed from bent metal or an extruded plastic/polymer. The size, shape, and configuration of the mounting bracket 40—including the openings 44-46—tends to be uniform or substantially uniform in the industry to facilitate installation and maintenance between different light fixtures, poles, and installation environments.

In practice, a field technician will hold or secure the mounting bracket 40 against the exterior of the pole 12 in the desired location. The openings 44, 46 can be used by the technician to form corresponding, aligned openings 14, 16 in/through the pole 12. Whether the pole 12 is metal, wooden or concrete the openings 14, 16 in the pole 12 extend all way through the pole. The middle opening 45 is used for receiving and securing, e.g., by welding, the first end 32 of the support arm 30 to connect the streetlight 10 to the mounting bracket 40.

It would be desirable from a structural integrity standpoint for both openings 14, 16 to be formed by the technician during every streetlight 10 installation such that two fasteners can be passed through the aligned pairs of openings 14, 44 and 16, 46 to secure the mounting bracket 40 to the pole 12. In practice, however, the technician may only install a single fastener 48 through the upper opening 44 and into the aligned opening 14 to secure the mounting bracket 40 to the pole 12, i.e., there is no additional fastener extending through the openings 16, 46. Consequently, a less desirable connection exists between the mounting bracket 40 and the pole 12, thereby rendering the streetlight 10 more susceptible to damage from adverse weather conditions/street.

Figure 3:
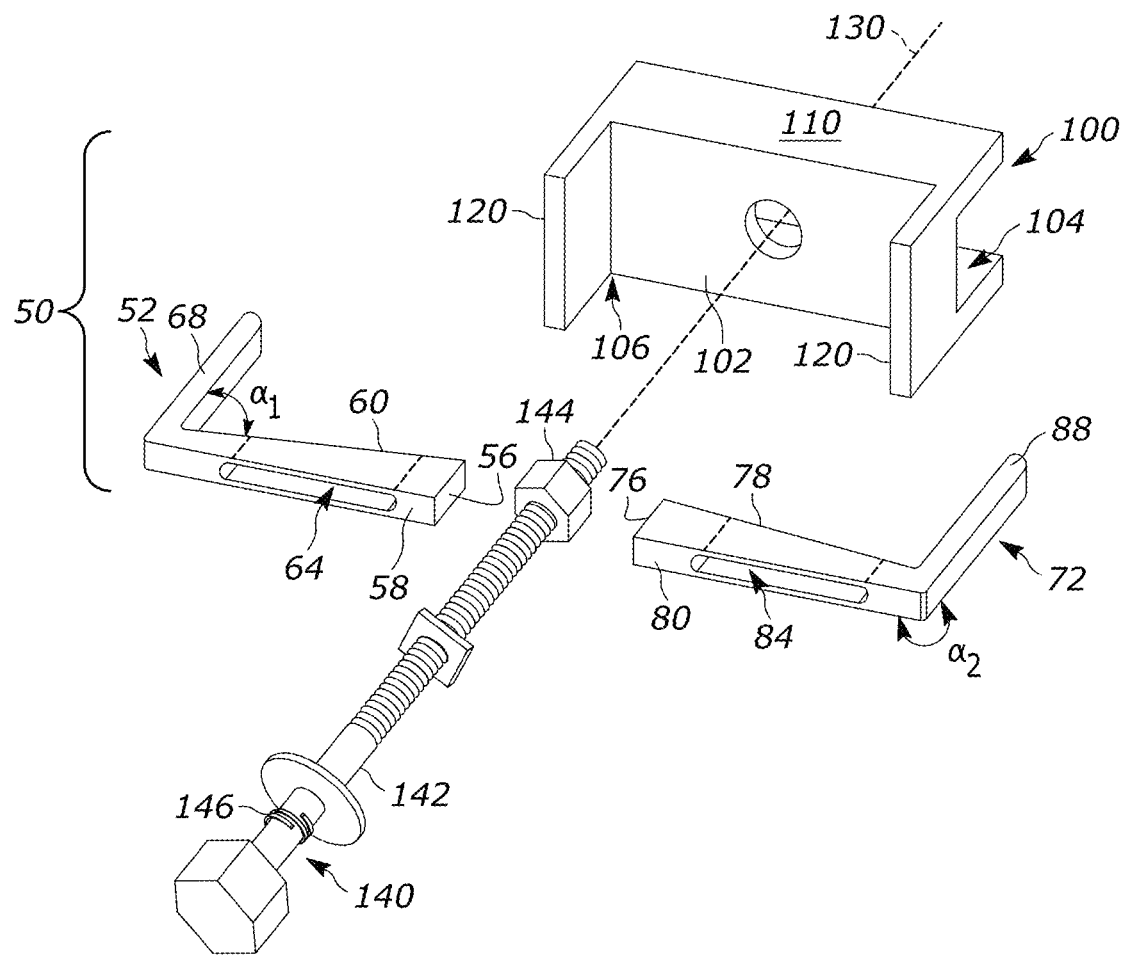
FIG. 3 is an example device for reinforcing the existing connection between the mounting bracket and the pole in accordance with the present invention.

FIG. 3 illustrates one example reinforcing device 50 in accordance with the present invention for helping reinforce a single fastener connection between a mounting bracket and a pole, such as the single fastener 48 connection between the mounting bracket 40 and the pole 12. The device 50 includes first and second mounting arms 52, 72 and an optional bracket or adapter 100 and a fastener 140.

The mounting arms 52, 72 and adapter 100 are made from durable materials, such as metal. The first mounting arm 52 includes a base 56 having a first surface 58 and a second surface 60. An elongated projection 68 extends from the base 56. The base 56 is wedge-shaped such that the first surface 58 extends perpendicular or substantially perpendicular to the length of the projection 68. The second surface 60 extends transverse to the first surface 58 and to the projection 68 so as to form an acute angle $\alpha_1$ between the second surface and the projection 68. An elongated slot 64 extends through the base 56 from the first surface 58 to the second surface 60.

The second mounting arm 72 includes a base 76 having a first surface 78 and a second surface 80. An elongated projection 88 extends from the base 76. The base 76 is wedge-shaped such that the first surface 78 extends perpendicular or substantially perpendicular to the length of the projection 88. The second surface 80 extends transverse to the first surface 78 and to the projection 88 so as to form an obtuse angle $\alpha_2$ between the second surface and the projection 78. An elongated slot 84 extends through the base 76 from the first surface 78 to the second surface 80.

Figure 4A:
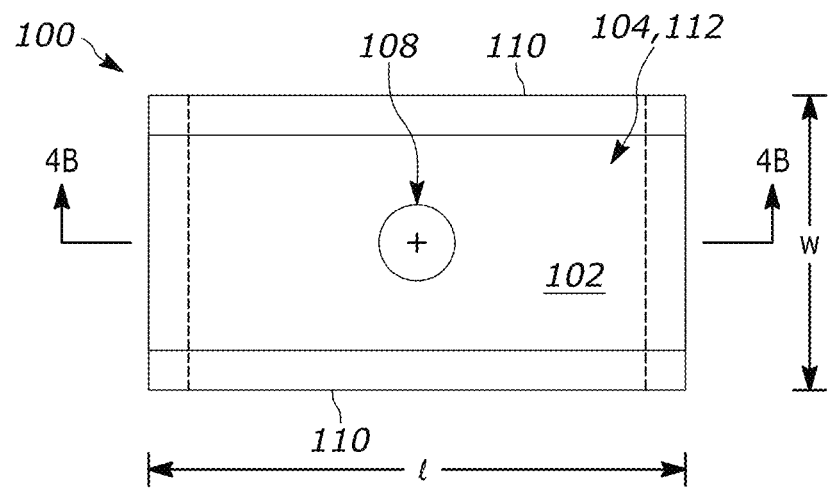
FIG. 4A is a top view of an adapter of the reinforcing device of FIG. 3 in accordance with an example of the present invention.
Figure 4B:
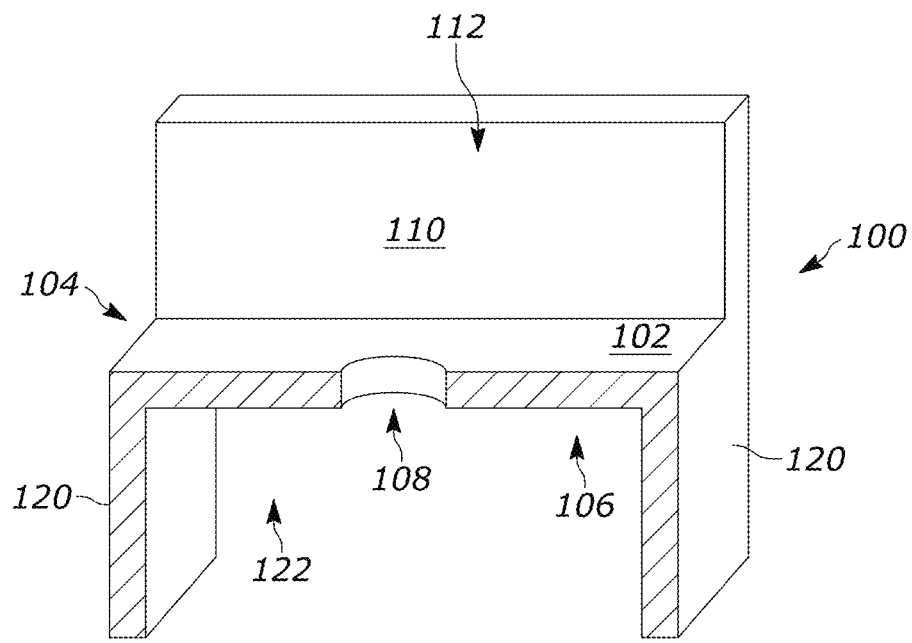
FIG. 4B is a section view of the adapter of FIG. 4A taken along line 4B-4B in accordance with an example of the present invention.

Turning further to FIGS. 4A-4B, the adapter 100 includes a base 102 having a first side 104 and a second side 106. The base 102 has a length l and a width w. An opening 108 extends through the base 102. A pair of projections 110 extends from the first side 104 of the base 102 along the entire length l thereof. The projections 110 extend parallel to one another. The projections 110 and base 102 cooperate to define a receiving space 112. A pair of projections 120 extends from the second side 106 of the base 102 along the entire width w thereof. The projections 120 extend parallel to one another and perpendicular to the projections 110. The projections 112 and base 102 cooperate to define a receiving space 122.

Referring back to FIG. 3, in one example the fastener 140 includes a carriage bolt 142 and nut 144. Other conventional components, such as washer(s) and/or lock spring(s) 146 can also be provided.

Figure 5A:
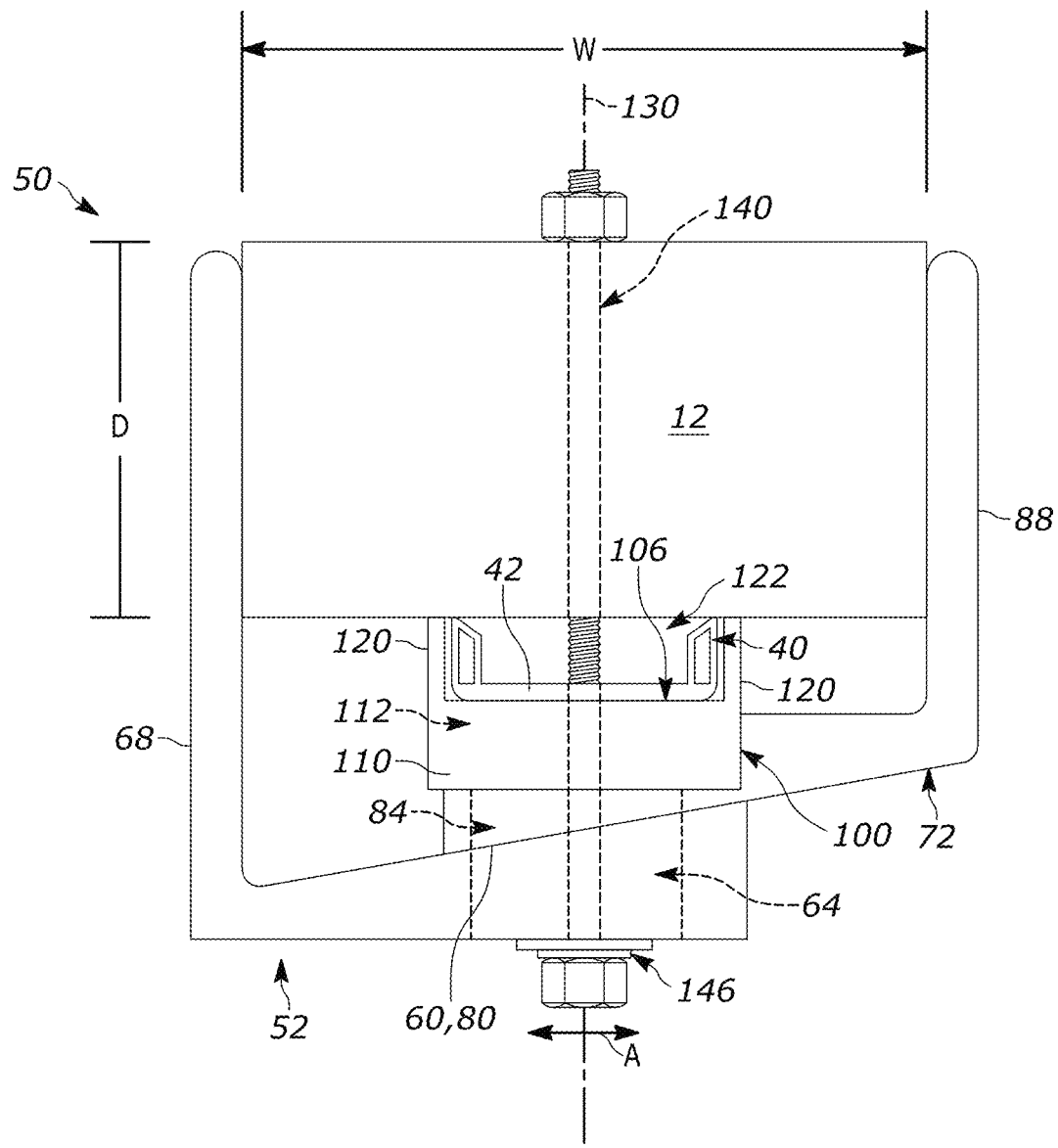
FIG. 5A is a schematic illustration of the reinforcing device secured to the mounting bracket and the pole in accordance with an example of the present invention.
Figure 5B:
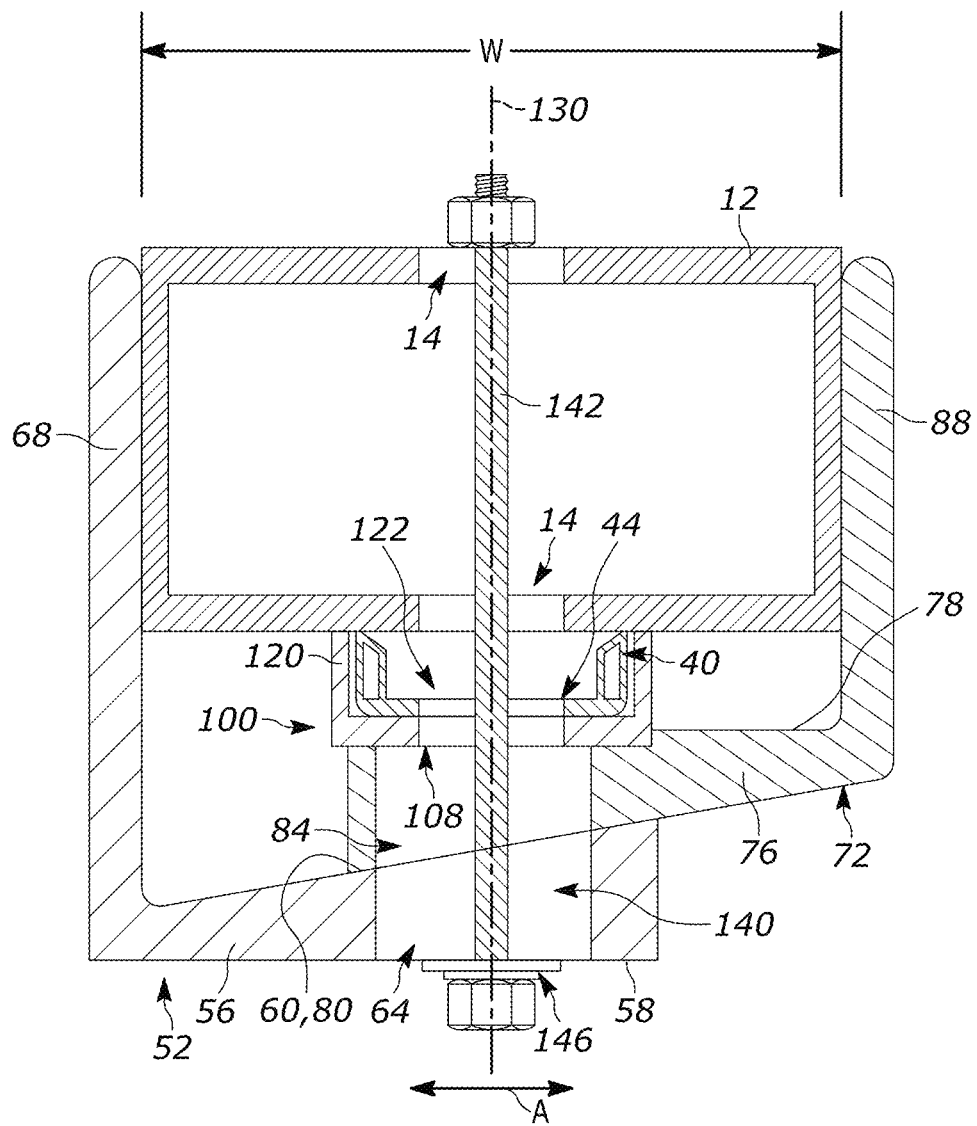
FIG. 5B is a section view of FIG. 5A in accordance with an example of the present invention.

As shown in FIGS. 3 and 5A-5B, to install the device 50, the adapter 100 is positioned over the existing mounting bracket 40 on the pole 12 such that the mounting bracket 40 is located in the receiving space 122 between the projections 120. In particular, the adapter 100 is oriented along the mounting bracket 40 such that the opening 108 in the base 102 is aligned with the lower opening 46 in the mounting bracket. The receiving space 122 is sized such that the projections 120 abut or are positioned in close proximity to the lateral sides of the mounting bracket 40 while the second side 106 of the base 102 abuts the base 42. This allows the installer to readily slide the adapter 100 up and down along the mounting bracket 40 within a fixed plane until the openings 46, 108 are aligned.

The base 76 of the second mounting arm 72 is then inserted into the receiving space 112 between the projections 110 with the first surface 78 of the second mounting arm 72 abutting the first side 104 of the base 102. The projections 110 keep the second mounting arm 72 aligned with the base 102. The first mounting arm 52 is then positioned against the second mounting arm 72 such that the surfaces 60, 80 engage one another at an interface. This arrangement positions the projections 68, 88 along opposite sides of the pole 12.

With this in mind, the device 50 is configured to accommodate a wide range of pole 12 sizes and cross-sectional shapes. To this end, the mounting arms 52, 72 can slide relative to one another along the interface at the surfaces 60, 80 in the manner indicated generally at A to change the distance between the projections 68, 88 to accommodate the width W of the particular pole 12 being used.

When this occurs, the positions of the slots 64, 84 relative to the aligned openings 46, 108 changes. The elongated shape of the slots 64, 84, in combination with the projections 110, helps to ensure at least a portion of each passage is aligned with the openings 46, 108. The projections 120 on the adapter 100 prevent movement of adapter in the manner A during movement of the mounting arms 52, 72 and tightening of the fastener 140.

At the same time, the projections 110 on the adapter 100 allow for movement of the base 76 of the second mounting arm 72 in the manner A during movement of the arms 52, 72 and tightening of the fastener 140 but prevent movement of the base 76 in the direction perpendicular to the manner A. That said, regardless of the width W of the pole 12, the mounting arms 52, 72 can be moved relative to one another while still forming a continuous passage through the entire device 50 aligned along a common centerline 130.

The fastener 140 can then be installed along the centerline 130 through the aligned slots 64, 84, openings 46, 108, and passage 16 and tightened to clamp the device 50 to the pole 12 in the front-to-back direction shown in FIGS. 5A and 5B. Furthermore, due to the wedge shape of the bases 56, 76, clamping the device 50 to the pole 12 likewise causes the projections 68, 88 to clamp against sides of the pole 12 in the left-to-right direction shown in FIGS. 5A and 5B. Consequently, tightening the fastener 140 rigidly fixes the device 50 to the pole 12, thereby rigidly fixing the mounting bracket 40 and streetlight 10 connected thereto to the pole.

As shown, the projections 110 on the adapter 100 extend over the sides of only the end of the base 76 of the second mounting arm 72. Alternatively, the projections 110 could extend over both the end of the base 76 of the second mounting arm 72 as well as the end of the base 56 of the first mounting arm 52 (not shown) to help maintain both passages 64, 84 in alignment with the openings 46, 108 during movement of the mounting arms 52, 72 and tightening of the fastener 140. Regardless of the construction of the pole 12, a single fastener 140 is used to rigidly secure the device 50 to the pole 12 by clamping the device 50 to the pole 12.

It will also be appreciated that in practice it may turn out that the bottom opening 46 in the mounting bracket 40 already has a fastener 48 securing it to the pole 12, but the upper opening 44 is not secured to the pole with a similar fastener. In this situation, the same device 50 can be used and rely on a single fastener 140 cooperating with the upper opening 44 to rigidly secure the device 50 to the pole 12.

The device of the present invention is advantageous in that it can reinforce the existing connection between the mounting bracket and the pole with a single bolt and can accommodate various sizes and shapes of pole, i.e., the device is universal. This provides an easily adaptable, retrofit kit that can be implemented on any existing streetlight mounting device. As a result, nearly any existing streetlight having a single fastener connection to a pole can be more robustly secured thereto, which helps improve the resilience of the streetlight mounting device to adverse weather conditions, such as high winds and heavy rain.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A device for reinforcing a connection between a mounting bracket and a pole, comprising:
   a first mounting arm having a first base with a first slot and a first projection extending from the first base for engaging a first side of the pole;
   a second mounting arm having a second base with a second slot and a second projection extending from the second base for engaging a second side of the pole; and
   a single fastener extending through the first and second slots in the first and second mounting arms, an opening in the mounting bracket, and into the pole for fixing the device to the pole.

2. The device recited in claim 1, wherein the first and second bases of the first and second mounting arms are wedge-shaped.

3. The device recited in claim 2, wherein each of the first base and the second base includes a first surface extending perpendicular to the respective mounting arm and a second surface extending transverse to the respective mounting arm, the second surfaces of the first and second mounting arms engaging one another when the device is fixed to the pole.

4. The device recited in claim 3, wherein the second surfaces are slidable along and relative to one another to change a distance between the first and second projections of the first and second mounting arms to accommodate a width of the pole.

5. The device recited in claim 1, further comprising an adapter for extending over a portion of the mounting bracket and a portion of the second mounting arm for limiting relative movement between the mounting bracket, the adapter, and the second mounting arm.

6. The device recited in claim 5, wherein the adapter comprises:
   a base for engaging the mounting bracket and the second mounting arm;
   first projections extending over opposing sides of the mounting bracket; and
   second projections extending over opposing sides of the second mounting arm.

7. The device recited in claim 6, wherein the first projections extend perpendicular to the second projections.

8. The device recited in claim 6, wherein the first projections extend parallel to one another, and wherein the second projections extend parallel to one another.

9. The device recited in claim 6, wherein the first projections limit relative movement between the mounting bracket and the adapter in a first direction and the second projections limit relative movement between the adapter and the second mounting arm in a second direction perpendicular to the first direction.

10. The device recited in claim 5, wherein the base of the adaptor has an adapter opening aligned with the opening in the mounting bracket and the first and second slots in the first and second mounting arms such that the single fastener passes through the adapter opening in the base when the device is fixed to the pole.

11. A device for reinforcing a connection between a mounting bracket and a pole, comprising:
    a first mounting arm having a first wedge-shaped base with a first slot and a first projection extending from the first base for engaging a first side of the pole;
    a second mounting arm having a second wedge-shaped base with a second slot and a second projection extending from the second base for engaging a second side of the pole;
    an adapter for extending over a first portion of the mounting bracket and a second portion of the second mounting arm for limiting relative movement between the mounting bracket, the adapter, and the second mounting arm; and
    a single fastener extending through the first and second slots in the first and second mounting arms, an opening in the mounting bracket, and into the pole for fixing the device to the pole.

12. The device recited in claim 11, wherein each of the first and second wedge-shape bases includes a first surface extending perpendicular to the respective mounting arm and a second surface extending transverse to the respective mounting arm, the second surfaces of the first and second mounting arms engaging one another when the device is fixed to the pole.

13. The device recited in claim 11, wherein the second surfaces are slidable along and relative to one another to change a distance between the first and second projections of the first and second mounting arms to accommodate a width of the pole.

14. The device recited in claim 11, wherein the adapter comprises:
    a base for engaging the mounting bracket and the second mounting arm;
    first projections extending over opposing sides of the mounting bracket; and
    second projections extending over opposing sides of the second mounting arm.

15. The device recited in claim 14, wherein the first projections extend parallel to one another, and wherein the second projections extend parallel to one another.

16. The device recited in claim 14, wherein the first projections limit relative movement between the mounting bracket and the adapter in a first direction and the second projections limit relative movement between the adapter and the second mounting arm in a second direction perpendicular to the first direction.

17. The device recited in claim 11, wherein the base of the adaptor has an adaptor opening aligned with the opening in the mounting bracket and the first and second slots in the first and second mounting arms such that the fastener passes through the adaptor opening in the base when the device is fixed to the pole.

18. A method for installing a device that reinforces a connection between a mounting bracket and a pole, comprising the steps of:
   positioning a first mounting arm having a first base with a first slot and a first projection extending from the first base along a first side of the pole;
   positioning a second mounting arm having a second base with a second slot and a second projection extending from the second base along a second side of the pole such that the first and second bases are aligned and engage one another; and
   passing a single fastener through the first and second slots in the first and second mounting arms, an opening in the mounting bracket, and into the pole for fixing the device to the pole.

19. The method of claim 18, further comprising positioning an adapter between the second mounting arm and the mounting bracket, the adapter extending over a first portion of the mounting bracket and a second portion of the second mounting arm for limiting relative movement between the mounting bracket, the adapter, and the second mounting arm.

20. The method of claim 18, further comprising sliding the first and second bases across and relative to one another to change a distance between the first and second projections of the first and second mounting arms to accommodate a width of the pole.

* * * * *